H. ANDERSON.
BEEHIVE.
APPLICATION FILED MAR. 21, 1913.
1,073,458.
Patented Sept. 16, 1913.
3 SHEETS—SHEET 1.
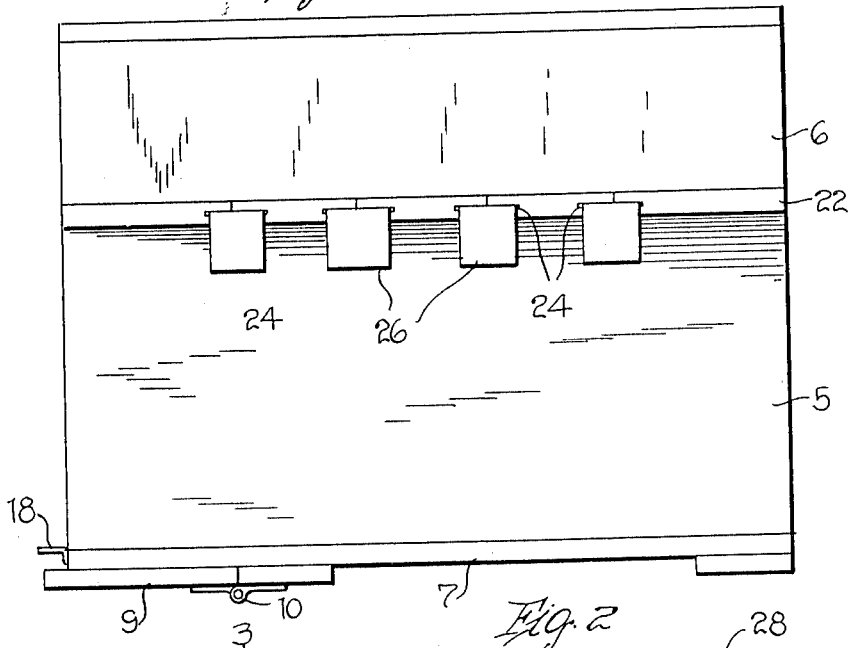
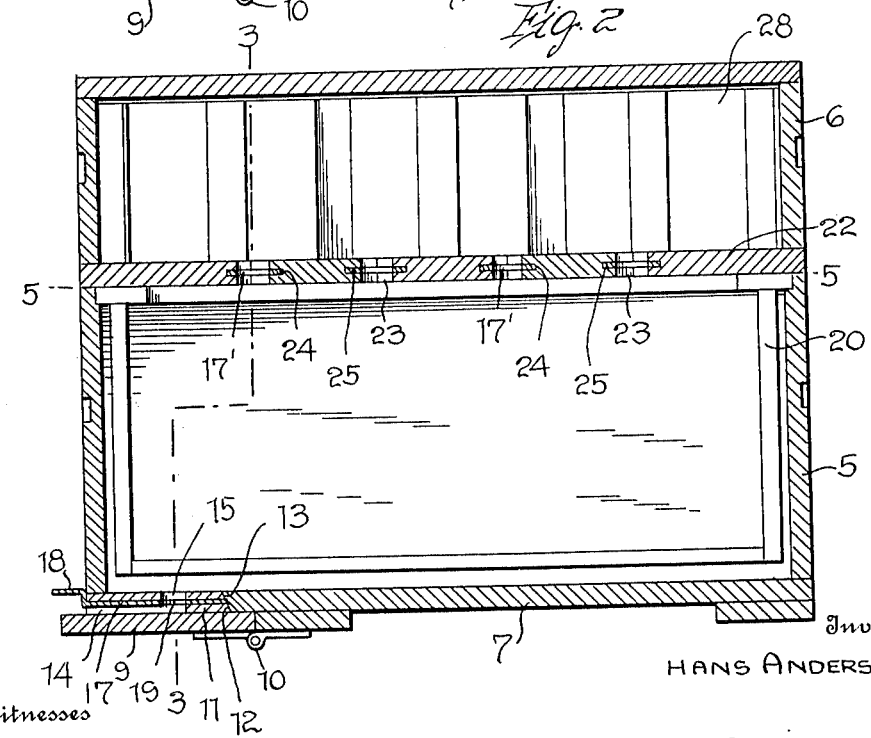
Witnesses
Robert M. Sutphend.
A. I. Hind.
Inventor
HANS ANDERSON
By Watson E. Coleman
Attorney

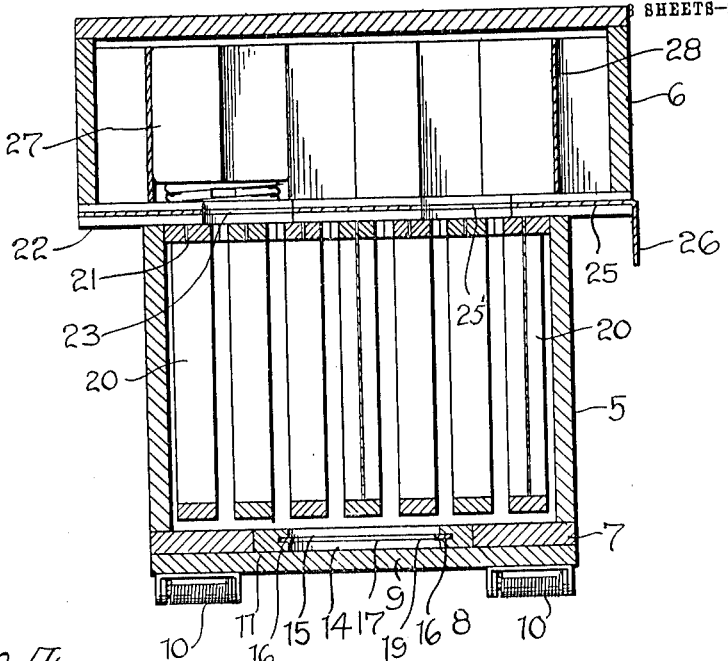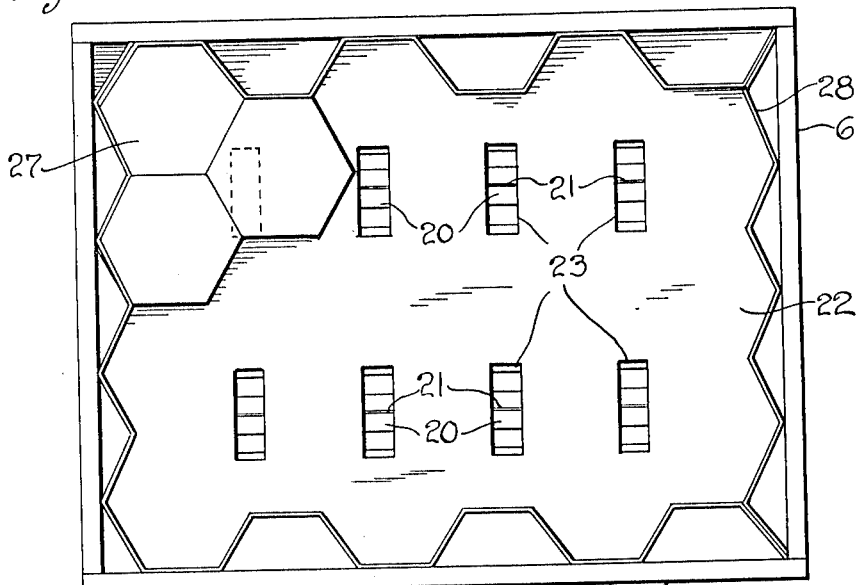

H. ANDERSON.
BEEHIVE.
APPLICATION FILED MAR. 21, 1913.
1,073,458.
Patented Sept. 16, 1913.
3 SHEETS—SHEET 3.
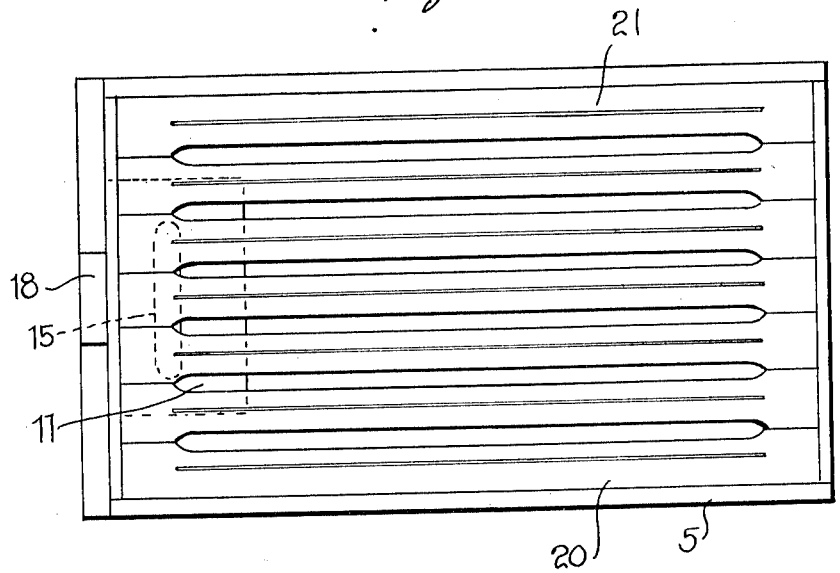
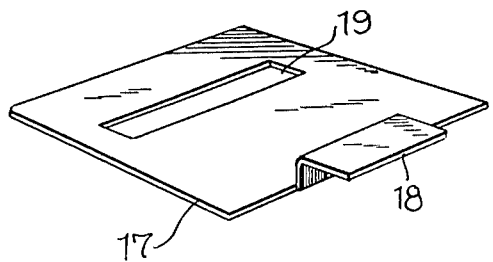
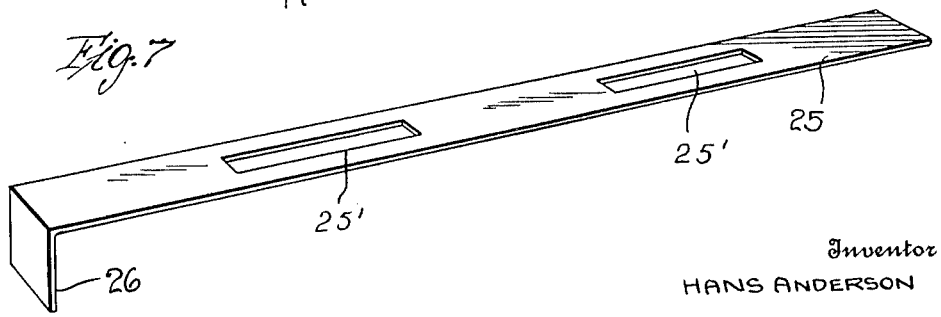
Inventor
HANS ANDERSON

UNITED STATES PATENT OFFICE.

HANS ANDERSON, OF HEALDSBURG, CALIFORNIA.

BEEHIVE.

1,073,458.  Specification of Letters Patent.  Patented Sept. 16, 1913.

Application filed March 21, 1913. Serial No. 756,044.

*To all whom it may concern:*

Be it known that I, HANS ANDERSON, a citizen of the United States, residing at Healdsburg, in the county of Sonoma and State of California, have invented certain new and useful Improvements in Beehives, of which the following is a specification, reference being had to the accompanying drawings.

This invention relates to improvements in bee hives, and has for one of its objects to provide an improved entrance whereby bees may enter to the interior of the hive, said entrance being provided with a guard which will effectively prevent the entrance of moths or other destroying insects into the hive.

Another object of the invention is to provide an entrance to the hive of the above character which is carried by a spring door, whereby said door may be readily opened when desired to admit a swarm of bees into the hive.

A still further object of the invention is to provide improved means for fastening the waxwork foundation within the hive.

A further object of the invention resides in the provision of improved means whereby the storage compartment of the hive may be shut off from that portion of the hive occupied by the bees so that the honey can be harvested without interference upon the part of the bees.

A further object of the invention is to provide a bee hive having the improved features above noted, which is simple in its construction, may be produced at comparatively small cost, and is of great convenience and serviceability in practical use.

With the above and other objects in view, the invention consists in the novel features of construction, combination and arrangement of parts as will be hereinafter referred to and more particularly pointed out in the specification and claims.

In the accompanying drawings forming a part of this application, Figure 1 is a side elevation of a bee hive embodying the present invention. Fig. 2 is a longitudinal section thereof. Fig. 3 is a transverse section taken on the line 3—3 of Fig. 2. Fig. 4 is a top plan view with the top wall of the storage compartment removed. Fig. 5 is a detail horizontal section taken on the line 5—5 of Fig. 2. Fig. 6 is a detail perspective view of the entrance guard member. Fig. 7 is a similar view of one of the slide plates.

Referring in detail to the drawings, 5 designates the lower or body portion of the hive, which is preferably constructed of wood and is of rectangular form in plan, while 6 designates the upper storage compartment of the hive which is preferably of slightly greater width than the body portion 5 thereof.

The bottom wall 7 of the body 5 of the hive is provided at one of its ends with an entrance opening 8 which is normally closed by means of the door 9, provided with spring hinges 10. Upon the upper surface of this door, a rectangular block 11 is secured, and the inner longitudinal edge of this block is beveled, as shown at 12, for engagement with the correspondingly beveled edge 13 of the entrance opening 8. The block 11 normally occupies this entrance opening and the same is provided with a cut-out under surface, indicated at 14, so as to space the same from the surface of the door 9. In the body of the block 11 an elongated slot 15 is provided, through which the bees may enter into the interior of the hive. At the opposite edges of the cut-out under surface 14 of the block 11, the same is provided with longitudinal guide grooves or channels 16 to receive the edges of the metal slide member 17. This slide member is preferably constructed of tin or other sheet metal and is provided upon one end with an angularly disposed finger piece, indicated at 18, whereby said member may be readily adjusted in the groove 16. This metal slide member is further provided with a slot 19, which is adapted to register with the slot 15 in the block 11 when said member is forced inwardly to the limit of its movement. It is obvious, that after the bees have entered into the interior of the hive, this slide member 17 may be pulled outwardly so as to disaline the slot therein with the slot in the block 11, thus closing the latter slot and effectually preventing the escape of the bees. By the provision of this slide member, the entrance of moths or other insects which would destroy the bees is also obviated, and as the bees themselves, as is well known, establish guards at the entrance to the hive, a double guard is in effect thus produced.

Within the body 5 of the hive, a series of foundation frames 20 are arranged, said frames at their upper ends being suitably secured to the bottom of the storage compartment 6. The upper longitudinal bars of each of the frames 20 is provided with a longitudinal slit, indicated at 21. The edge of the foundation for a waxwork is placed within this slit and by merely pressing inwardly upon the opposite sides of the longitudinal frame bars, the same is caused to adhere to the opposite side walls of the slit, thus supporting the foundation in place.

The bottom wall 22 of the storage compartment 6 is provided with spaced series of rectangular openings 23 which may be of any desired dimensions. This bottom wall is made up of board strips or sections, the longitudinal edges of each of which is notched to provide the openings 23, and said sections are further provided with longitudinal guide grooves 24 to receive the closure plates 25 which are slidably mounted therein. These closure plates project at one of their ends beyond one side of the storage compartment and exteriorly thereof, and are downwardly turned, as indicated at 26, to provide a suitable finger piece whereby the plates may be readily adjusted. These plates are provided with spaced longitudinal openings 25' to coincide with the openings 23 in the bottom wall of the storage compartment whereby the bees may enter from the interior of the body of the hive into the storage compartment. In this storage compartment 6, a plurality of jars or containers, indicated at 27, are arranged, in which the honey is deposited by the bees. These jars or containers are of novel construction, but as the same constitute the subject matter of a separate application for patent filed coincident herewith, they will not be described in detail. It will suffice to state that they are of such form as to properly coöperate with a sheet metal rack or strip, indicated at 28, which is secured at intervals to the side walls of the compartment 6. This rack which is preferably formed of sheet tin, occupies the space between the jars or containers and the boundary wall of the storage compartment, and is provided for the purpose of preventing the deposition of honey by the bees upon the outside of the jars.

From the above description, it will be apparent that when it is desired to harvest the honey, the operator at the proper time pulls the slide plates 25 outwardly, thereby closing the openings 23 in the bottom wall of the storage compartment and confines the bees within the body 5 of the hive. Thus the jars or other containers in which the honey has been deposited may be removed without danger of the operator being stung. When the bees are driven in swarms to the hive, the operator may move the door 9 to its open position, and dispose the block 11 and the slide member carried by said door out of the entrance opening 8 in the base wall of the hive body, thus providing an entrance of generous proportions through which a large number of bees may enter the hive. During the harvesting of the honey or the inspection of the same, the slide member is pulled outwardly so as to close the entrance to the hive and prevent the escape of the bees therefrom, thus eliminating all liability of the operator being stung.

From the foregoing, it is believed that the several novel features, their advantages, and the manner of operation of my invention will be clearly and fully understood. Owing to the comparatively simple construction of the hive, it will be appreciated that the same can be produced without necessitating the employment of skilled labor and at small cost. The device is also highly convenient and serviceable in practical use and not only affords complete protection to the bees, but also provides means whereby the operator may be protected in harvesting the honey.

It is to be understood, that while I have above described the preferred embodiment of the present invention, and the manner in which the same is to be practically applied, the same is nevertheless susceptible of considerable modification without departing from the spirit or sacrificing any of the advantages of the same.

What is claimed is:—

1. A bee hive comprising a body having an entrance opening in one of its walls, a block movable into and out of said opening and normally closing the same, said block being provided with an entrance slot through which the bees may enter to the interior of the hive, and a movable guard member mounted in the block to open and close said slot.

2. A bee hive comprising a body having an entrance opening in one of its walls, a block movable into and out of said opening and normally closing the same, said block being provided with an entrance slot through which the bees may enter to the interior of the hive, and a guard member slidably mounted upon said block and provided with a slot coinciding with the slot in the block, said guard member being adapted for movement to dispose the slot therein out of register with the slot in said block.

3. A bee hive comprising a body provided with an entrance opening in one of its walls, a door hingedly mounted upon said wall, a block secured to said door to fit within and close said entrance opening, a portion of said block being spaced from the door and provided with an entrance slot therein through which the bees may enter into the interior of the hive, and means movably mounted upon said block to open or close said slot.

4. A bee hive comprising a body provided with an entrance opening in its bottom wall, a spring held closure for said entrance opening, said closure having an entrance channel for the bees communicating with the interior of the hive, and means carried by said closure to close the entrance channel.

5. A bee hive comprising a body provided with an entrance opening in its bottom wall, a door hingedly mounted upon said bottom wall and extending entirely across the same, a block carried by said door normally disposed within the entrance opening and provided with a channel communicating with the interior of the hive, and means adjustaby mounted in said block to open and close communication between the channel thereof and the interior of the hive.

In testimony whereof I hereunto affix my signature in the presence of two witnesses.

HANS ANDERSON.

Witnesses:
GEORGE E. REMMEL,
PHIL. A. HENDLEY.

Copies of this patent may be obtained for five cents each, by addressing the "Commissioner of Patents, Washington, D. C."